US007289308B2

(12) United States Patent
Kimura

(10) Patent No.: US 7,289,308 B2
(45) Date of Patent: Oct. 30, 2007

(54) OVERCURRENT PROTECTION CIRCUIT

(75) Inventor: Katsunori Kimura, Chiba (JP)

(73) Assignee: Seiko Instruments Inc. (JP)

( * ) Notice: Subject to any disclaimer, the term of this patent is extended or adjusted under 35 U.S.C. 154(b) by 515 days.

(21) Appl. No.: 10/996,746

(22) Filed: Nov. 24, 2004

(65) Prior Publication Data

US 2005/0157437 A1 Jul. 21, 2005

(30) Foreign Application Priority Data

Nov. 25, 2003 (JP) ............................ 2003-393341

(51) Int. Cl.
*H02H 3/08* (2006.01)

(52) U.S. Cl. ...................... 361/93.1; 323/277; 323/273

(58) Field of Classification Search .................. 361/90, 361/93.1; 323/277, 273
See application file for complete search history.

(56) References Cited

U.S. PATENT DOCUMENTS

| | | | | |
|---|---|---|---|---|
| 5,666,044 A * | 9/1997 | Tuozzolo | .................... | 323/277 |
| 6,222,355 B1 * | 4/2001 | Ohshima et al. | ............ | 323/282 |
| 7,079,368 B2 * | 7/2006 | Ishikawa et al. | ........... | 361/93.1 |

FOREIGN PATENT DOCUMENTS

| | | | |
|---|---|---|---|
| JP | 406209584 A | * | 1/1993 |

* cited by examiner

*Primary Examiner*—Michael Sherry
*Assistant Examiner*—Tien Mai
(74) *Attorney, Agent, or Firm*—Adams & Wilks

(57) ABSTRACT

An overcurrent protection circuit has an output voltage detection resistor for detecting an output voltage. A foldback overcurrent protection circuit detects an output current flowing through an output transistor and controls the output current flowing through the output transistor in accordance with the detected output current. A first logic generating circuit receives an overcurrent detection signal from the foldback overcurrent protection circuit corresponding to the detected output current. A second logic generating circuit receives a detection signal from the output voltage detection resistor corresponding to a decrease in the detected output voltage. An AND circuit receives and processes an overcurrent delay signal generated by the first logic generating circuit and a voltage detection signal generated by the second logic generating circuit. A negative voltage generating circuit receives an output from the AND circuit and outputs a negative voltage to the foldback overcurrent protection circuit to control the output current flowing through the output transistor.

10 Claims, 2 Drawing Sheets

OVERCURRENT PROTECTION CIRCUIT

BACKGROUND OF THE INVENTION

1. Field of the Invention

The present invention relates to an overcurrent protection circuit for controlling an output current of a voltage regulator configured by semiconductor integrated circuit.

2. Description of the Related Art

FIG. 2 is a circuit diagram showing a configuration of a conventional foldback overcurrent protection circuit corresponding to a voltage regulator constituted by a depletion transistor as an output transistor. When output current flows through the depletion output transistor 4, detection current also flows through a foldback overcurrent protection circuit 8 accordingly.

When a level of the detection current reaches a predetermined value which is set inside the foldback overcurrent protection circuit 8, the foldback overcurrent protection circuit 8 starts to control the output current flowing through the depletion output transistor 4. In this case, a source voltage becomes the output voltage since the depletion output transistor 4 operates as a source follower. In order that the output current vs. output voltage characteristic curve should show a foldback characteristic, a gate voltage of the depletion output transistor 4 must be lower than the output voltage. In addition, when the output voltage is at the GND level, in order to further reduce the output current, the gate voltage needs to be made negative. However, in the conventional foldback overcurrent protection circuit, it is difficult to reduce the output current flowing through the depletion output transistor since the depletion output transistor is controlled by a circuit which operates at the input voltage VDD and whose reference voltage is GND by using a detection voltage within the output voltage ranging between input voltage VDD and GND.

The solid line in FIG. 3 shows the output current vs. output voltage characteristic in overcurrent detection state by the foldback overcurrent protection circuit corresponding to the voltage regulator constituted by a depletion output transistor. The dotted line shows a curve which is required for a foldback protection circuit and which has already been implemented in a regulator constituted by an enhancement mode output transistor. As shown in the figure, the output current increases from a point "v" on a characteristic curve before detection of overcurrent and at the knee point overcurrent is detected. When overcurrent is detected, the output current decreases. Through a point "b", however, the output current increases to a point "c" on the characteristic curve, not to a point "a". Thus, the output current is not reduced, but increases (refer to JP 7-74976 B for example).

Heretofore, the foldback overcurrent protection circuit for the voltage regulator constituted by a depletion mode output transistor has a disadvantage in that it is difficult to control the output current vs. output voltage characteristic to show an ideal foldback characteristic because the output voltage ranging between VDD and GND is utilized for the detection voltage for the overcurrent protection circuit.

SUMMARY OF THE INVENTION

In light of the foregoing, the present invention has been made in order to solve the above-mentioned problems associated with the prior art, and it is, therefore, an object of the present invention to provide a regulator constituted by a depletion mode output transistor having an overcurrent protection circuit which is capable of controlling the output current vs. output voltage characteristic to show a foldback characteristic curve by operating a negative voltage generating circuit upon detection of an overcurrent.

In order to attain the above-mentioned object, the present invention provides a voltage regulator constituted by a depletion mode output transistor with an overcurrent protection circuit, including: a foldback overcurrent protection circuit, an output voltage detection resistor, a first logic generating circuit which receives an overcurrent detection signal from the foldback overcurrent protection circuit as its input, a second logic generating circuit which receives a detection signal from the output voltage detection resistor representing decrease of the output voltage as its input, a negative voltage generating circuit, and an AND circuit.

DETAILED DESCRIPTION OF THE PREFERRED EMBODIMENTS

Figure 1:
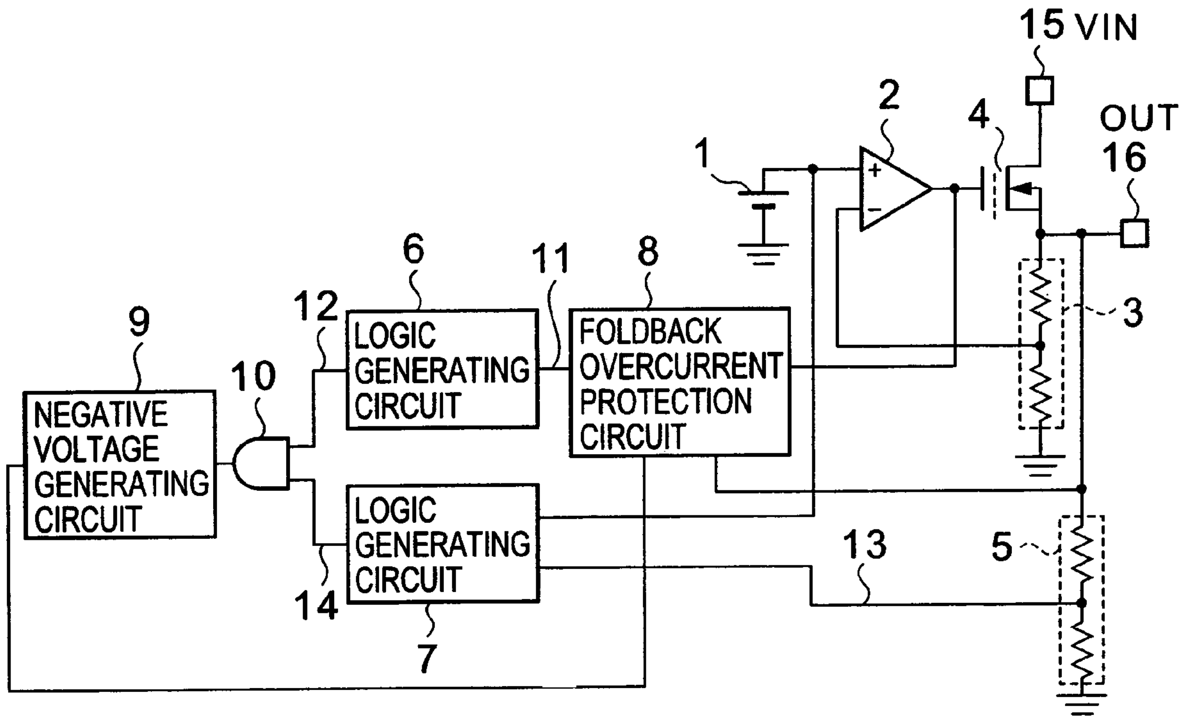
FIG. 1 is a circuit diagram showing a configuration of an overcurrent protection circuit according to an embodiment of the present invention.
Figure 2:
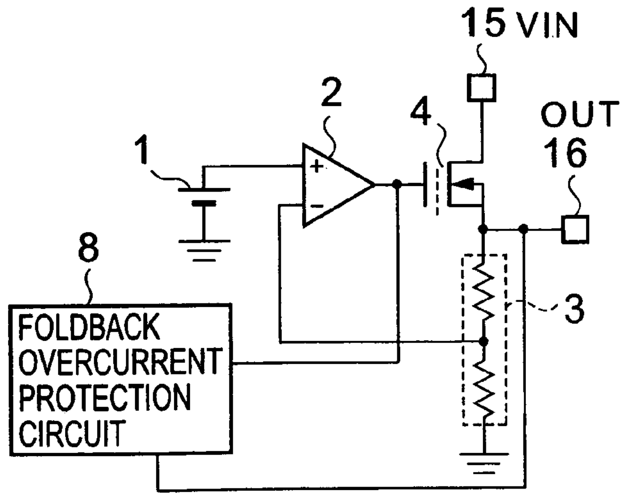
PRIOR ART FIG. 2
FIG. 2 is a circuit diagram showing a configuration of a conventional overcurrent protection circuit.

A preferred embodiment of an overcurrent protection circuit of the present invention will hereinafter be described in detail with reference to the accompanying drawings. FIG. 1 is a circuit diagram showing a configuration of an overcurrent protection circuit according to an embodiment of the present invention. A voltage regulator constituted by a depletion mode output transistor includes a reference voltage source 1, an amplifier 2, a feedback resistor 3, and a depletion mode output transistor 4. In addition, an overcurrent protection circuit for carrying out control so as to obtain the foldback output current vs. output voltage characteristic includes an output voltage detection resistor 5, a first logic generating circuit 6 which receives an overcurrent detection signal 11 as its input, a second logic generating circuit 7 which receives a detection signal 13 representing decrease of the output voltage as its input, a foldback overcurrent protection circuit 8, a negative voltage generating circuit 9, and an AND circuit 10.

First of all, an operation of the overcurrent protection circuit of this embodiment will hereinafter be described with reference to FIG. 1. When an output current flows through the depletion mode output transistor 4, detection current flows through the foldback overcurrent protection circuit 8 accordingly. When a level of the detection current reaches a predetermined value which is set inside the foldback overcurrent protection circuit 8, the foldback overcurrent protection circuit 8 operates to start the control for the output current flowing through the depletion mode output transistor 4. In addition, the detection signal 11 is also sent from the foldback overcurrent protection circuit 8. After start of the control for the output current, transient current is not needed to be detected, but a constantly flowing overcurrent has to be detected from the output current flowing through the depletion mode output transistor 4, so the first logic generating circuit 6 generates an overcurrent delay signal 12 by giving a predetermined delay time to the detection signal 11.

Figure 3:
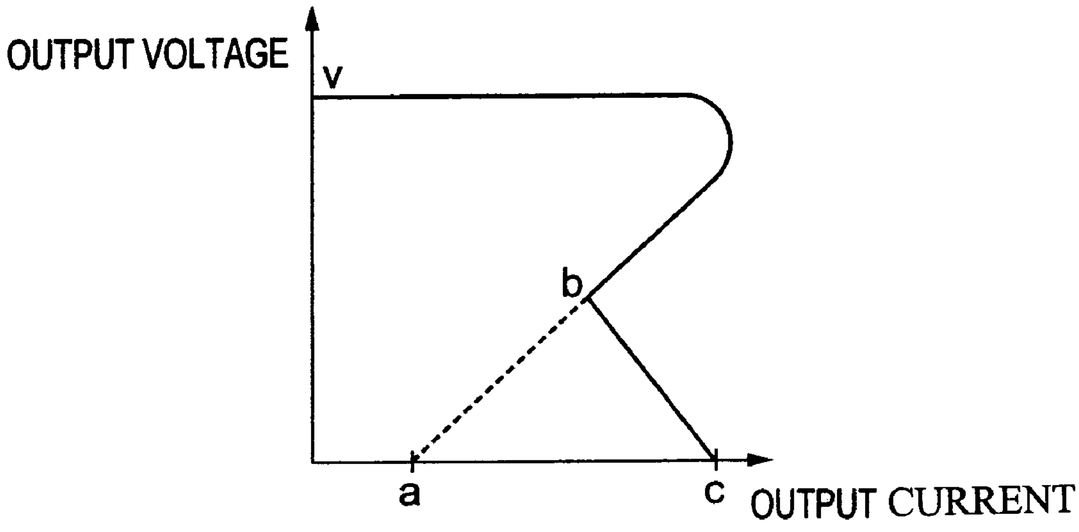
FIG. 3 is a graph showing output current vs. output voltage characteristic at detection of overcurrent with the overcurrent protection circuit of the embodiment of the present invention (dot line in part) and the conventional output current vs. output voltage characteristics at detection of overcurrent with the conventional overcurrent protection circuit (solid line).

At the same time, when the output voltage lowers to a voltage which is determined by the reference voltage source 1 and the output voltage detection resistor 5 by controlling the output current, the second logic generating circuit 7 generates a voltage detection signal 14 based on the resistor voltage division output signal 13 of the output voltage detection resistor 5 and the reference voltage source 1. The AND circuit 10 processes the two signals, the overcurrent delay signal 12 and the voltage detection signal 14, thereby operating the negative voltage generating circuit 9, a negative voltage output from the negative voltage generating circuit 9 controls the gate of the depletion mode output transistor 4 through the foldback overcurrent protection circuit 8. That is, in a case where the output voltage is reduced when the constant overcurrent flows through the depletion mode output transistor 4 right after the overcurrent is detected, the control conforming to the foldback output current vs. output voltage characteristic is carried out. FIG. 3 shows the output current vs. output voltage characteristic in this case. As apparent from FIG. 3, a point on the characteristic curve corresponding to the output current starts from the point "v" before detection of the overcurrent to pass through the point "b" at which the negative voltage output after detection of the overcurrent controls the gate of the depletion mode output transistor 4 and then follows a locus indicated by a dotted line to reach a final point "a". Thus, the foldback output current vs. output voltage characteristic is obtained.

What is claimed is:

1. An overcurrent protection circuit for detecting an output current flowing through an output transistor, the overcurrent protection circuit comprising:

an output voltage detection resistor for detecting an output voltage;

a foldback overcurrent protection circuit for detecting an output current flowing through an output transistor and for controlling the output current flowing through the output transistor in accordance with the detected output current;

a first logic generating circuit for receiving an overcurrent detection signal from the foldback overcurrent protection circuit corresponding to the detected output current;

a second logic generating circuit for receiving a detection signal from the output voltage detection resistor corresponding to a decrease in the detected output voltage;

an AND circuit for receiving and processing an overcurrent delay signal generated by the first logic generating circuit and a voltage detection signal generated by the second logic generating circuit; and a negative voltage generating circuit for receiving an output from the AND circuit and outputting a negative voltage to the foldback overcurrent protection circuit to control the flow of output current flowing through the output transistor.

2. An overcurrent protection circuit according to claim 1; wherein the foldback overcurrent protection circuit starts to control the output current flowing through the output transistor when the detected output current reaches a predetermined value.

3. An overcurrent protection circuit according to claim 2; wherein the predetermined value of the output current is set in the foldback overcurrent protection circuit.

4. An overcurrent protection circuit according to claim 2; wherein after the foldback overcurrent protection circuit starts to control the output current flowing through the output transistor, the foldback overcurrent protection circuit detects a constantly flowing overcurrent from the output current flowing through the output transistor so that the first logic generating circuit generates the overcurrent delay signal by applying a predetermined time delay to the overcurrent detection signal.

5. An overcurrent protection circuit according to claim 2; wherein the second logic generating circuit generates the voltage detection signal when the foldback overcurrent protection circuit controls the output current to lower the output voltage detected by the output voltage detection resistor to a preselected output voltage.

6. In a voltage regulator having a depletion mode output transistor, an overcurrent protection circuit for controlling an output current flowing through the depletion mode output transistor, the overcurrent protection circuit comprising:

an output voltage detection resistor for detecting an output voltage of the voltage regulator;

a foldback overcurrent protection circuit for detecting an output current flowing through the depletion mode output transistor and for controlling the output current flowing through the depletion mode output transistor in accordance with the detected output current;

a first logic generating circuit for receiving an overcurrent detection signal from the foldback overcurrent protection circuit corresponding to the detected output current level;

a second logic generating circuit for receiving a detection signal from the output voltage detection resistor corresponding to a decrease in the detected output voltage;

an AND circuit for receiving and processing an overcurrent delay signal generated by the first logic generating circuit and a voltage detection signal generated by the second logic generating circuit; and a negative voltage generating circuit for receiving an output from the AND circuit and outputting a negative voltage to the foldback overcurrent protection circuit to control the output current flowing through the depletion mode output transistor.

7. A voltage regulator according to claim 6; wherein the foldback overcurrent protection circuit starts to control the output current flowing through the depletion mode output transistor when the detected output current reaches a predetermined value.

8. A voltage regulator according to claim 7; wherein the predetermined value of the output current is set in the foldback overcurrent protection circuit.

9. A voltage regulator according to claim 7; wherein after the foldback overcurrent protection circuit starts to control the output current flowing through the depletion mode output transistor, the foldback overcurrent protection circuit detects a constantly flowing overcurrent from the output current flowing through the depletion mode output transistor so that the first logic generating circuit generates the overcurrent delay signal by applying a predetermined time delay to the overcurrent detection signal.

10. A voltage regulator according to claim 7; wherein the second logic generating circuit generates the voltage detection signal when the foldback overcurrent protection circuit controls the output current flowing through the depletion mode output transistor to lower the output voltage detected by the output voltage detection resistor to a preselected output voltage.

* * * * *